(12) United States Patent
Turner et al.

(10) Patent No.: US 6,462,811 B1
(45) Date of Patent: Oct. 8, 2002

(54) AUTOMATIC CIRCULAR SAW TOOTH INSPECTION SYSTEM AND METHOD

(75) Inventors: James P. Turner, Linden; Salvatore R. Trinchera, Stockton; Charles H. Zierdt, Oakland, all of CA (US)

(73) Assignee: California Cedar Products Company, Stockton, CA (US)

( * ) Notice: Subject to any disclaimer, the term of this patent is extended or adjusted under 35 U.S.C. 154(b) by 0 days.

(21) Appl. No.: 09/625,629

(22) Filed: Jul. 26, 2000

Related U.S. Application Data

(60) Provisional application No. 60/145,879, filed on Jul. 27, 1999.

(51) Int. Cl.$^7$ .............................................. G01N 21/00
(52) U.S. Cl. .................... 356/237.1; 348/125; 73/865.8
(58) Field of Search .......................... 356/237.1, 237.2, 356/237.3, 237.4, 237.5, 237.6, 614, 601, 602; 73/865.8; 348/125, 128

(56) References Cited

U.S. PATENT DOCUMENTS 4,695,157 A * 9/1987 Schoenbaum et al. ...... 356/237

(List continued on next page.)

FOREIGN PATENT DOCUMENTS

| DE | 3410149 | 10/1985 | ........... G01B/11/02 |
| DE | 3906555 A1 | 7/1989 | ........... G02B/21/06 |

(List continued on next page.)

OTHER PUBLICATIONS

PCT International Search Report dated Oct. 20, 2000 re International No. PCT/US 00/20345, international filing date Jul. 26, 2000.

*Primary Examiner*—Hoa Q. Pham
(74) *Attorney, Agent, or Firm*—Koppel, Jacobs, Patrick & Heybl

(57) ABSTRACT

A system for inspecting first and second surfaces of a cutting member, such as a tooth of a carbide tooth circular saw blade, includes a support for carrying the cutting member, the cutting member being movable relative to the support to position the surfaces to be inspected within an inspection zone. First and second video cameras mounted on the apparatus relative to the inspection zone provide output signals representative of the images of the first and second surfaces, respectively. A computer responsive to the output signals generated by the first and second video cameras analyzes the output signals and calculates selected attributes of the surfaces presented for inspection. A frame grabber captures video images of the surfaces. A first video monitor coupled to the computer displays images of the surfaces being inspected while a second video monitor coupled to the computer displays graphical data relating to selected geometrical attributes of the surfaces. The system utilizes the video image data and an appropriate algorithm to control a servo motor to accurately position the cutting member in the field of view. Upper and lower semicircular light transmitters, coupled to a light source, surround the inspection zone to uniformly illuminate the zone and provide a sharp contrast between the surfaces under inspection and the background. Also disclosed is a method for inspecting first and second surfaces of a cutting member, such as a tooth of a carbide tooth circular saw, using first and second video cameras, respectively, the method comprising the steps of moving the cutting member to position the first and second surfaces within an inspection zone, providing electrical video signals from the first video camera representative of the image of the first surface presented for inspection, storing a frame of said video signals provided by the first video camera, providing electrical video signals from the second camera representative of the image of the second surface presented for inspection, storing a frame of said video signals provided by the second camera, and displaying the stored frames.

27 Claims, 14 Drawing Sheets

U.S. PATENT DOCUMENTS

| | | | |
|---|---|---|---|
| 4,774,640 A | 9/1988 | Montean, Jr. ................ | 362/89 |
| 5,038,258 A | 8/1991 | Koch et al. ................. | 362/237 |
| 5,118,193 A * | 6/1992 | Brown et al. ............... | 356/394 |
| 5,861,564 A | 1/1999 | Lister et al. ............... | 73/865.8 |

FOREIGN PATENT DOCUMENTS

| | | | |
|---|---|---|---|
| EP | 866308 A2 | 9/1989 | ........... G01B/11/24 |
| FR | 2579745 | 10/1986 | ........... G01B/11/24 |

* cited by examiner

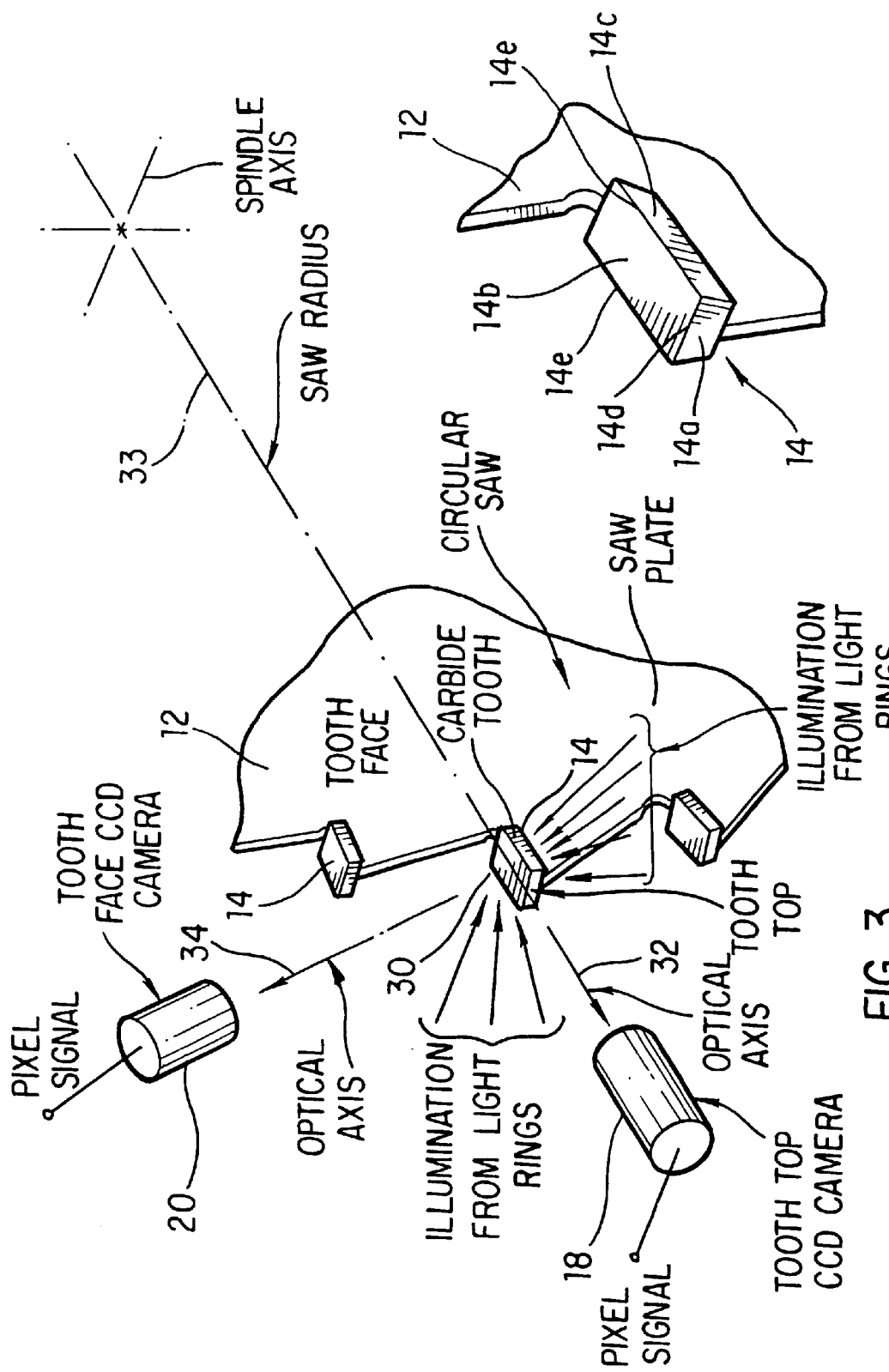

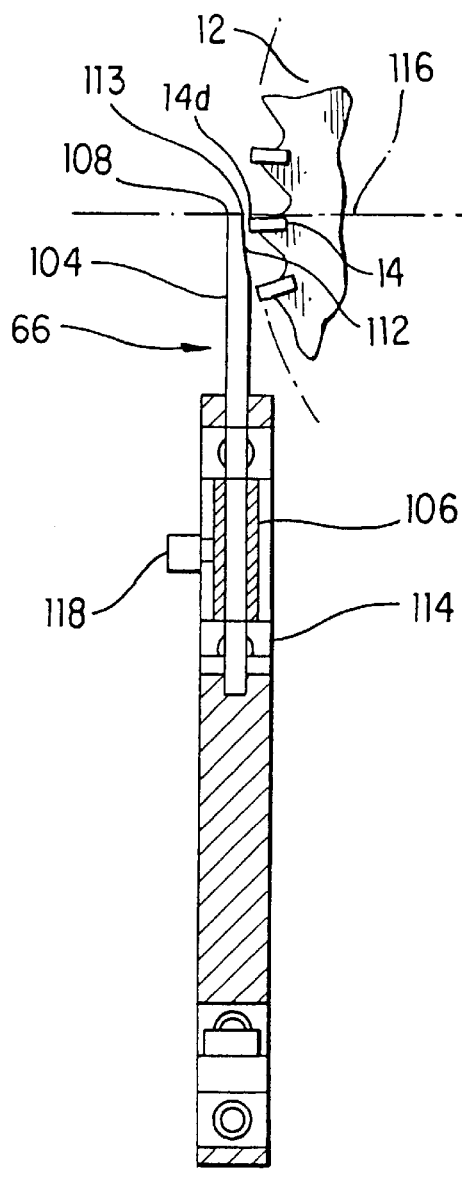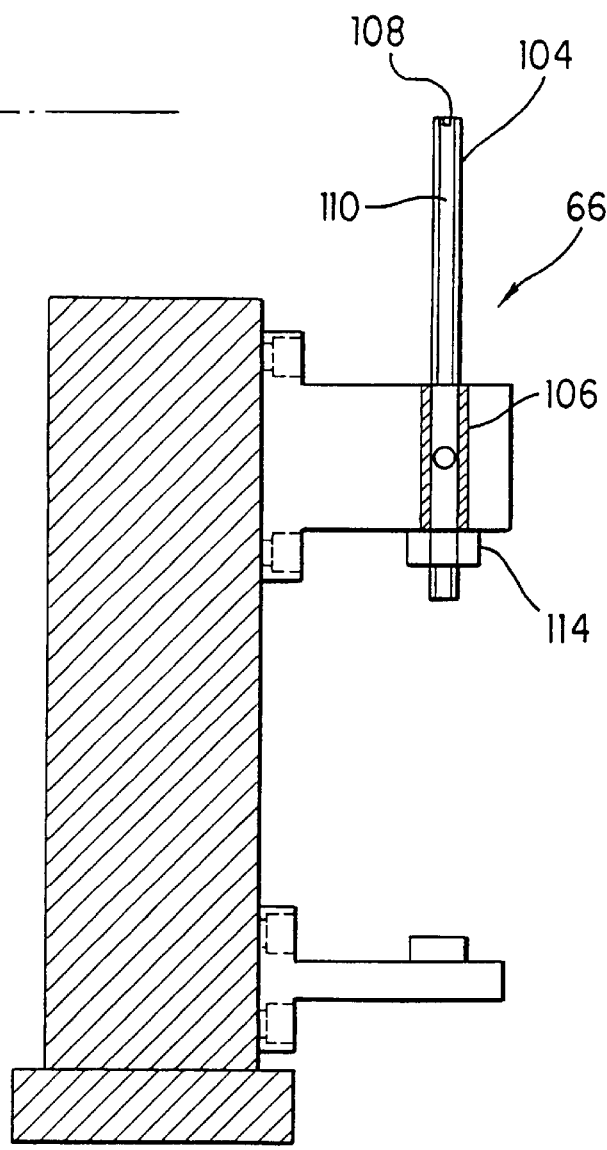
FIG. 4a
FIG. 4b

VIEW OF TOOTH TOP
(HOLLOW GROUND TOOTH)

VIEW OF TOOTH FACE
(EXAMPLE 1)

VIEW OF TOOTH FACE
(EXAMPLE 2)

Cal0 0.006211 Os0 0.82  Cal1 0.006035 Os1 +0.79 Ro1 +0.52 Ang +0.0

| TN | Kerf | LSet | RSet | LRA | RRA | LLA | RLA | RoPb | RoTp | FROT | RROT | LBA | RBA | Top1 | Top3 | LBH | RBH | R | TT | t60 |
|---|---|---|---|---|---|---|---|---|---|---|---|---|---|---|---|---|---|---|---|---|
| 1 | 3.30 | 0.50 | 0.50 | 5.3 | 5.8 | −0.4 | 1.8 | 0.04 | 0.04 | −0.0 | −0.0 | −0.00 | 0.00 | 0.00 | 0.00 | 0.00 | 0.00 | 0.3 | 10 |
| 2 | 3.32 | 0.50 | 0.52 | 4.7 | 4.8 | 0.4 | 2.2 | 0.05 | 0.05 | −0.0 | −0.2 | 17.92 | 23.87 | 1.70 | 0.00 | 0.55 | 0.33 | 0.4 | 12 |
| 3 | 3.30 | 0.49 | 0.51 | 5.7 | 6.0 | −1.5 | 1.4 | 0.04 | 0.06 | 0.0 | −0.0 | −0.00 | 0.00 | 0.00 | 0.00 | 0.00 | 0.00 | 0.3 | 10 |
| 4 | 3.31 | 0.47 | 0.54 | 3.9 | 5.3 | 0.8 | 2.9 | 0.05 | 0.08 | −0.0 | −0.3 | 21.18 | 23.65 | 1.70 | 0.00 | 0.66 | 0.34 | 0.4 | 12 |
| 5 | 3.29 | 0.47 | 0.52 | 5.2 | 5.6 | −0.7 | 1.6 | 0.06 | 0.07 | 0.0 | −0.0 | −0.00 | 0.00 | 0.00 | 0.00 | 0.00 | 0.00 | 0.3 | 10 |
| 6 | 3.32 | 0.50 | 0.51 | 5.0 | 4.9 | 0.4 | 2.5 | 0.06 | 0.06 | −0.0 | −0.3 | 18.11 | 23.72 | 1.68 | 0.00 | 0.55 | 0.32 | 0.4 | 12 |
| 7 | 3.31 | 0.52 | 0.50 | 5.5 | 5.8 | −1.0 | 1.8 | 0.06 | 0.05 | 0.0 | −0.0 | −0.00 | 0.00 | 0.00 | 0.00 | 0.00 | 0.00 | 0.3 | 10 |
| 8 | 3.32 | 0.52 | 0.50 | 4.3 | 5.2 | 0.5 | 2.3 | 0.06 | 0.05 | 0.0 | −0.3 | 18.14 | 23.90 | 1.70 | 0.00 | 0.56 | 0.33 | 0.4 | 12 |
| 9 | 3.30 | 0.51 | 0.49 | 5.5 | 5.9 | −1.0 | 2.0 | 0.05 | 0.05 | 0.0 | −0.1 | −0.00 | 0.00 | 0.00 | 0.00 | 0.00 | 0.00 | 0.4 | 10 |
| 10 | 3.32 | 0.51 | 0.50 | 4.8 | 4.2 | −0.1 | 2.7 | 0.05 | 0.05 | 0.0 | −0.3 | 18.72 | 24.07 | 1.69 | 0.00 | 0.57 | 0.33 | 0.4 | 12 |

(ONE-DECIMAL VALUES REPRESENT ANGLES, OTHERS ARE DISTANCES)

FIG. 14

DESCRIPTION OF DATA FILE HEADINGS

| | |
|---|---|
| TN | TOOTH NUMBER |
| Kerf | KERF |
| Lset | LEFT SET |
| Rset | RIGHT SET |
| LTA | LEFT TANGENTIAL ANGLE |
| RTA | RIGHT TANGENTIAL ANGLE |
| LRA | LEFT RADIAL ANGLE |
| RRA | RIGHT RADIAL ANGLE |
| FCA | FACE ANGLE |
| RoPb | RUNOUT OF PROBE |
| RoTp | RUNOUT FROM TOP CAMERA |
| Rrot | RADIAL RUNOUT |
| LBA | LEFT BEVEL ANGLE |
| RBA | RIGHT BEVEL ANGLE |
| Top1 | FACE VIEW |
| Top2 | FACE VIEW |
| Top3 | FACE VIEW |
| LBH | LEFT BEVEL HEIGHT |
| RBH | RIGHT BEVEL HEIGHT |
| Hlo | HOLLOW GROUND DEPTH (TOP CAMERA VIEW) |
| TT | TOOTH TYPE |

FIG.15

AUTOMATIC CIRCULAR SAW TOOTH INSPECTION SYSTEM AND METHOD

CROSS REFERENCE TO RELATED APPLICATION

This application claims the benefit of provisional application Ser. No. 60/145,879 filed Jul. 27, 1999, which is incorporated herein by reference in its entirety.

BACKGROUND OF THE INVENTION

1. Field of the Invention

The present invention relates generally to the inspection and measurement of cutting tools and particularly to video camera-based systems and methods for inspecting and measuring each tooth of a multitooth saw blade.

2. Description of the Prior Art

To provide a high degree of cutting efficiency, accuracy and safety, the geometry of the teeth of multitooth circular saws as well as the straightness or flatness of the saw blade plate must be accurately maintained. To this end, industrial quality control systems have been developed for optically inspecting and measuring the geometries of the individual saw blade teeth and for grinding or, if necessary, replacing those teeth whose geometries fall outside prescribed limits. Saw blade plate runout, that is, the displacement of the blade from a reference plane, is also measured and, if necessary, the trueness of the blade is restored using special bending equipment.

Rapid and accurate inspection and measurement techniques are especially needed for the maintenance of present day thin kerf circular saws having small carbide teeth. By way of example, such teeth may have a kerf of only 1.3 mm yet have relatively complex geometries that cannot be efficiently inspected and measured manually or by conventional optical techniques. Thus, there have been developed systems for inspecting and measuring the teeth of carbide tooth saw blades that rely on a video camera to provide a magnified image of individual saw teeth. Computer software is used to analyze each tooth and provide visual inspection and measurement capabilities.

A video camera-based apparatus for inspecting the teeth of carbide tooth saw blades is disclosed in U.S. Pat. No. 5,861,564 issued Jan. 19, 1999. The apparatus of the '564 patent includes a base upon which the saw blade to be inspected is movably mounted to permit positioning the saw blade to bring each tooth of the blade to a viewing location. A single video camera is mounted on an arm carried by the base. The arm is pivotable about first and second axes permitting the camera to be moved to various positions in succession to view the face, top and side of a given tooth positioned at the viewing location.

Although the apparatus of the '564 patent permits inspection and measurement of three major surfaces (face, top and side) of an individual saw tooth, it requires manual adjustments in order to make measurements of each tooth. Thus, the saw blade must be angularly indexed manually to bring each tooth within the viewing location. Following imaging of the tooth face, the arm carrying the video camera is then unlocked and manually rotated from its vertical position approximately 90° about the first axis and locked in place to position the camera to image the tooth top. Next, the arm is unlocked and raised back to its vertical position, then rotated about the second axis approximately 90° to a horizontal position to permit imaging of the tooth side. These adjustments are time-consuming and must be made for each tooth of a saw blade which may have several dozen teeth. Moreover, the apparatus of the '564 patent is incapable of measuring the plate runout of the saw blade being inspected.

Accordingly, there is a need for a video camera-based saw tooth inspection and measurement system and method that is more automated, that is, that eliminates the aforementioned manual steps to thereby reduce the time for saw blade tooth inspection and measurement. In addition, there is a need for an automatic tooth system and method that provide for the measurement of saw blade runout and does so automatically for various angular positions along the saw blade.

SUMMARY OF THE INVENTION

In accordance with one specific exemplary embodiment of the invention, there is provided a system for inspecting first and second surfaces of a cutting member, such as a tooth of a carbide tooth circular saw blade, includes a support for carrying the cutting member, the cutting member being movable relative to the support to position the surfaces to be inspected within an inspection zone. First and second video cameras mounted on the apparatus relative to the inspection zone provide output signals representative of the images of the first and second surfaces, respectively. A computer responsive to the output signals generated by the first and second video cameras analyzes the output signals and calculates selected attributes of the surfaces presented for inspection. A frame grabber captures video images of the surfaces. A first video monitor coupled to the computer displays images of the surfaces being inspected while a second video monitor coupled to the computer displays graphical data relating to selected geometrical attributes of the surfaces. The system utilizes the video image data and an appropriate algorithm to control a servo motor to accurately position the cutting member in the field of view. Upper and lower semicircular light transmitters, coupled to a light source, surround the inspection zone to uniformly illuminate the zone and provide a sharp contrast between the surfaces under inspection and the background.

In accordance with another specific embodiment of the invention, there is provided a method for inspecting first and second surfaces of a cutting member, such as a tooth of a carbide tooth circular saw, using first and second video cameras, respectively, the method comprising the steps of moving the cutting member to position the first and second surfaces within an inspection zone, providing electrical video signals from the first video camera representative of the image of the first surface presented for inspection, storing a frame of said video signals provided by the first video camera, providing electrical video signals from the second camera representative of the image of the second surface presented for inspection, storing a frame of said video signals provided by the second camera, and displaying the stored frames.

BRIEF DESCRIPTION OF THE DRAWINGS

Further objects, features and advantages of the invention will become evident from the Detailed Description of the Preferred Embodiments, below, when read in conjunction with the accompanying drawings in which:

FIG. 3 is a schematic, perspective view of a portion of the system of FIG. 1 showing first and second video cameras focused on the face and top, respectively, of a tooth of a carbide tooth circular saw blade positioned in the tooth inspection zone of the system of FIG. 1;

FIG. 3a is a perspective view of a typical tooth of a carbide tooth circular saw blade;

FIG. 4a is a side elevation view, partly in cross section, of a retractable saw tooth position setting device forming part of the system of FIG. 1;

FIG. 4b is a front elevation view, partly in cross section of the tooth setting device of FIG. 4a;

FIG. 14 is an example of a print out of a data file showing in table form various carbide tooth measurements that may be made with the system of the present invention; and FIG. 15 is a list defining data file headings.

DETAILED DESCRIPTION OF THE PREFERRED EMBODIMENTS

Although the present invention is particularly useful for the inspection and measurement of the surfaces (for example, the face and top) of the teeth of carbide tooth circular saw blades, it will be evident to those skilled in the art that the invention has broader utility, being applicable to the inspection of the surfaces of a variety of cutting tools.

Figure 1:
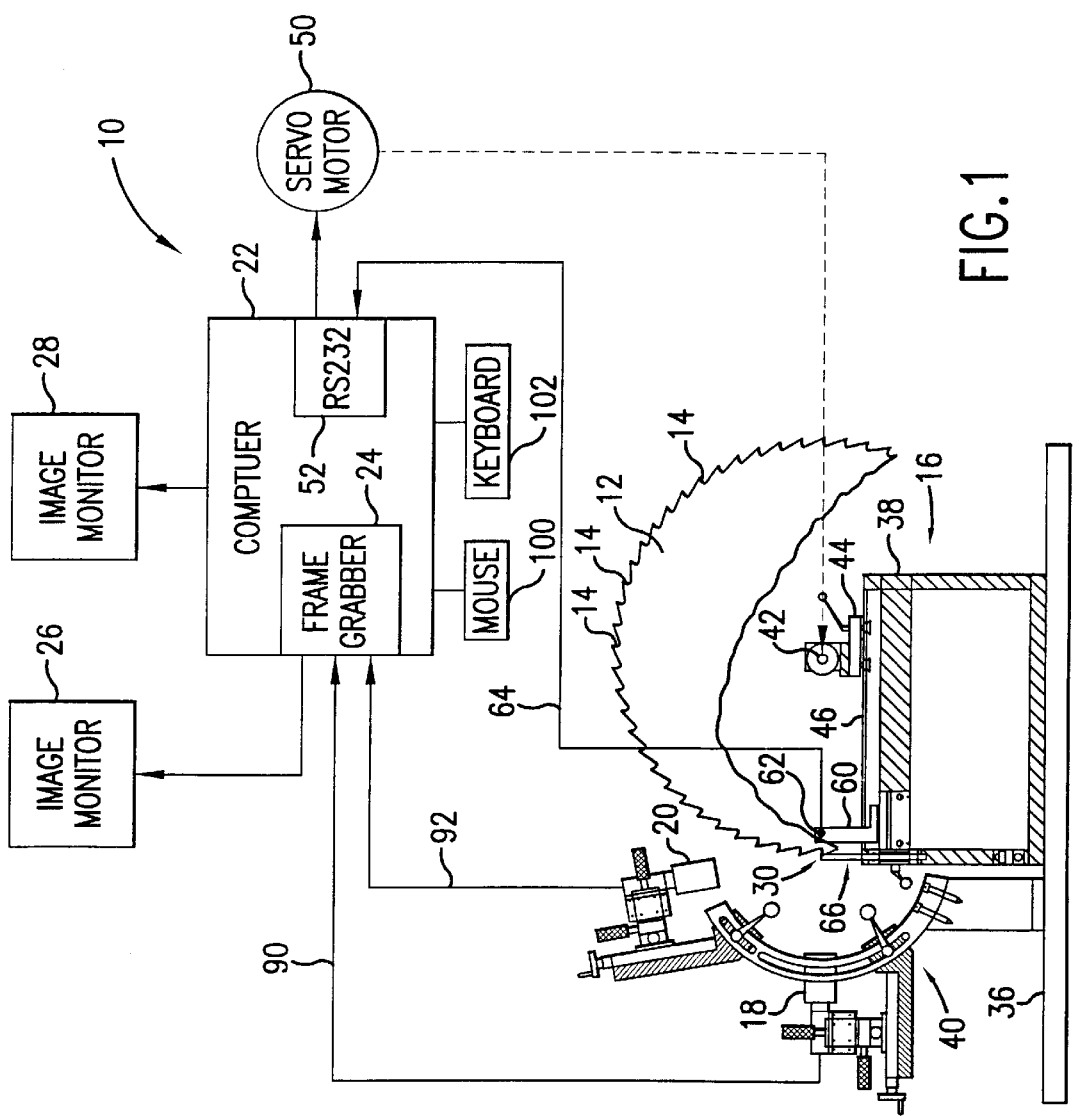
FIG. 1 is a schematic representation, partly in cross section, of a system in accordance with the present invention for inspecting and measuring each tooth of a carbide tooth circular saw blade.
Figure 2:
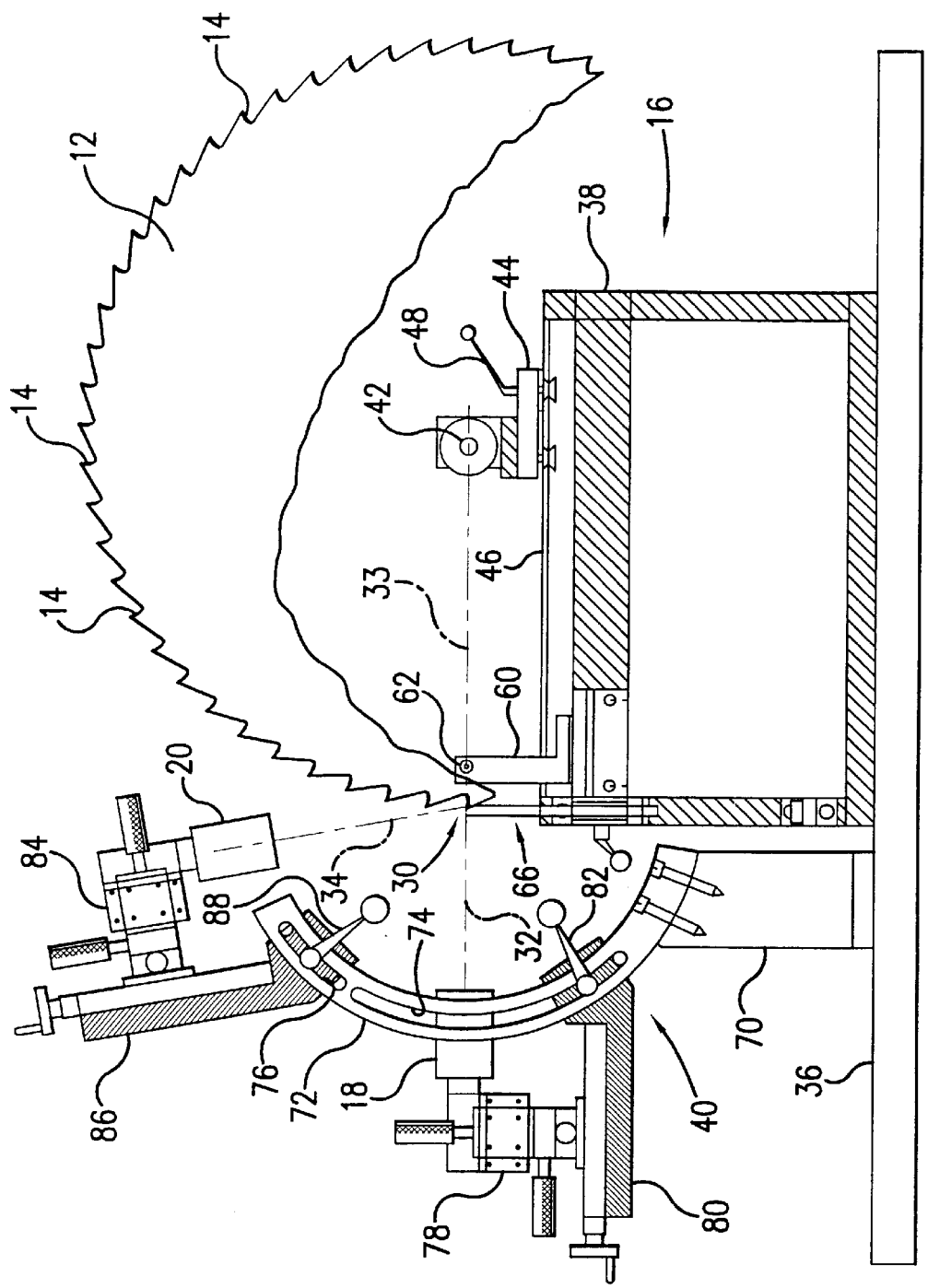
FIG. 2 is a side elevation view, partly in cross section, of a circular saw blade support apparatus forming part of the system of FIG. 1.

FIGS. 1–3 show a system 10 in accordance with the invention for automatically inspecting and measuring the teeth of a circular saw blade 12 having a nominal central plane and multiple carbide teeth 14 equiangularly spaced about the periphery of the saw blade. The system 10 generally includes an apparatus 16 for supporting first and second CCD video cameras 18 and 20 and the saw blade 12 being inspected; a computer 22 connected to the cameras and including a "frame grabber" board 24 for capturing video images generated by the cameras; and a pair of VGA display monitors 26 and 28 coupled to the computer 22.

The video cameras 18 and 20, which are equipped with telecentric microscopic zoom lenses, are both focused on a single saw tooth 14 positioned within an inspection zone 30. With reference also to FIG. 3a, as is well known, a typical carbide saw tooth such as the tooth 14 has several surfaces including a top surface 14a, a face 14b, and lateral or side surfaces 14c. The top and face of the tooth meet at a front, upper edge 14d, while the face and side surfaces meet along upper side edges 14e. In a preferred embodiment of the present invention, the first video camera 18 images the top 14a of the tooth 14 being inspected along a first optical axis 32 and the second video camera 20 images the face 14b of the same tooth along a second optical axis 34. The first optical axis 32 coincides substantially with a horizontal radius 33. When the cameras are properly aligned relative to a tooth to be inspected, the optical axes 32 and 34 will lie substantially in the nominal plane of the saw blade 12.

The supporting apparatus 16 of the system 10 includes a base 36, a saw blade support stand 38 mounted on the base 36, and a camera support assembly 40 mounted on the base 36 adjacent an end of the saw blade support stand. The saw blade 12 being inspected is mounted on a rotatable spindle 42 journaled in a slide 44 movable horizontally toward or away from the camera support assembly 40 along rails 46 on the upper surface of the support stand 38. The horizontal adjustability of the spindle slide 44 accommodates saw blades of various diameters. Once positioned, the spindle slide 44 is secured in place by means of a locking handle 48. The spindle 42 is rotated by a servo stepper motor 50 carried by the spindle slide 44 and coupled to an RS232 port 52 on the computer 22. The servo motor 50 provides fine adjustments of the position of the tooth to be inspected so that the tooth surfaces are brought into sharp focus. The servo motor also steps or indexes the saw blade to position successive saw blade teeth within the inspection zone 30.

A bracket 60 sidable horizontally along the rails 46 on the upper surface of the support stand 38 carries an electronic dial indicator or displacement probe 62 for engaging one surface of the circular saw blade or plate for measuring blade or plate runout relative to the nominal saw blade plane. The output of the probe 62 is connected to the RS232 port 52 of the computer via a line 64. The probe 62 can be moved radially relative to the saw blade 12 so as to provide measurements of saw plate runout at different saw radii. With reference to FIGS. 4a and 4b, also mounted on the support stand 38 adjacent the camera end thereof is a vertically oriented, positioning device 66 for roughly positioning the saw blade 12 in preparation for inspection.

The camera support assembly 40 comprises a pedestal 70 bolted to the base 36 and an upstanding bracket 72 in the form of a circular arc secured at its lower end to the top of the pedestal 70. The bracket 72 defines first and second arcuate slots 74 and 76. The first video camera 18 (also referred to as the top tooth face or x-axis camera) is mounted on an adjustable "xyz" slide 78 mounted in turn on a staging bed 80. The slide 78 is adjustable along three mutually perpendicular axes to provide fine positional adjustments of the first camera relative to the tooth being inspected. The staging bed 80 is secured to the lower portion of the circular bracket 72 by means of a locking handle 82 whose threaded portion passes through the lower slot 74 in the circular bracket. It will thus be seen that the angular orientation of the staging bed 80 as well as its position along the bracket 72 within the confines of the slot 74 are adjustable.

The mounting of the second video camera 20 (also referred to as the tooth face or y-axis camera) is similar to that of the first camera 18. Thus, the second camera 20 is carried by an adjustable "xyz" slide 84 in turn mounted on a staging bed 86 adjustably secured to the circular bracket 72 by means of a locking handle 88 whose threaded portion passes through the second arcuate slot 76 in the circular bracket.

Focus and alignments are accomplished by means of the camera support assembly 40 which centers all movements for angular adjustment at the upper front edge 14d of the saw tooth being inspected. Fine or micro adjustments may be made using the "xyz" adjustable slide 78, 84 interposed between each of the staging beds 80, 86 and the associated video camera.

The first CCD video camera 18 provides a stream of analog pixel signals to the frame grabber 24 along a line 90 connecting the camera and the frame grabber board. Each pixel signal has a magnitude representing the intensity of light reflected from a corresponding point on the tooth top 14a. Similarly, the second CCD video camera 20 presents to the frame grabber 24 a stream of analog pixel signals along a line 92. Each pixel signal from the second camera 20 has a magnitude representing the intensity of light reflected from a corresponding point on the tooth face 14b. Each pixel signal from the first and second cameras is converted by the frame grabber to a digital data signal representing the magnitude of the analog pixel signal. In accordance with techniques well known in the art, the images are automatically frozen and stored by the frame grabber. Then, utilizing appropriate threshold values keyed in by the operator, comparative measurements may be made using the contrast between the illuminated tooth surfaces and the background. The tooth should be as bright (white) as possible and the background as black as possible.

VGA monitor 26 selectively displays the tooth top and face images along with measured data. Fixed limit lines can be superimposed on the tooth top or face image for quick go/no-go inspection of the saw tooth. Tooth angles, width and clearances can be measured manually using a mouse 100 and/or a keyboard 102 connected to the computer 22. The second monitor 28 is used for system control and graphical display of data. Saw tooth inspection can be performed using an automatic or a manual mode.

Following installation on the spindle 42 of a circular saw blade 12 to be inspected, the spindle slide 44 is moved toward the camera support assembly 40 and the saw tooth position setting device 66 (FIGS. 4a and 4b) mounted on the support stand 38 is used to position a saw tooth 14 within the inspection zone 30 at the proper focal distance from the cameras. The saw position setting device 66 comprises a vertical rod or bar 104 sidably received within a sleeve 106 mounted on the saw blade support stand 38. The bar 104 includes a reference surface 108 at its upper extremity and a flat 110 ground along the length of the bar. Diametrically opposite the flat 110, adjacent the upper extremity of the bar, the outer surface of the bar is cut away to form a shallow recess 112 providing a reference edge 113 for the first tooth to be inspected. Affixed to the lower portion of the bar 104 is a collar 114 which engages the lower extremity of the sleeve 106 when the bar 104 is fully raised. The collar 114 is so positioned along the length of the bar that when the bar is fully raised, as in FIGS. 4a and 4b, the reference surface 108 lies precisely on a horizontal saw blade radius 116 intercepting the displacement probe 62 and the axis of the spindle 42 carrying the saw blade. A set screw 118 threadedly received by the sleeve 106 is tightened against the flat 110 on the bar 104 to securely clamp the bar in its raised position. The operator then moves the spindle slide 44 along the blade support stand 38 and adjusts the angular position of the blade 12 until the edge 14d of the first saw blade tooth to be inspected just touches the tooth position setting bar 104 at the reference edge 113. Once the tooth position has been thus roughly set radially and vertically, the set screw 118 is loosened allowing the setting bar 104 to be lowered out of the way or removed from the sleeve 106, and the spindle slide 44 is locked in place by means of a locking handle 48. At this point the operator can adjust light values for maximum contrast.

A tooth 14 moved into the inspection zone 30 is illuminated and viewed by the two video cameras 18 and 20 which receive light reflected along the optical axes. The tooth surfaces are illuminated uniformly and in a manner providing a high degree of contrast between the illuminated tooth surfaces and the background.

Figure 5:
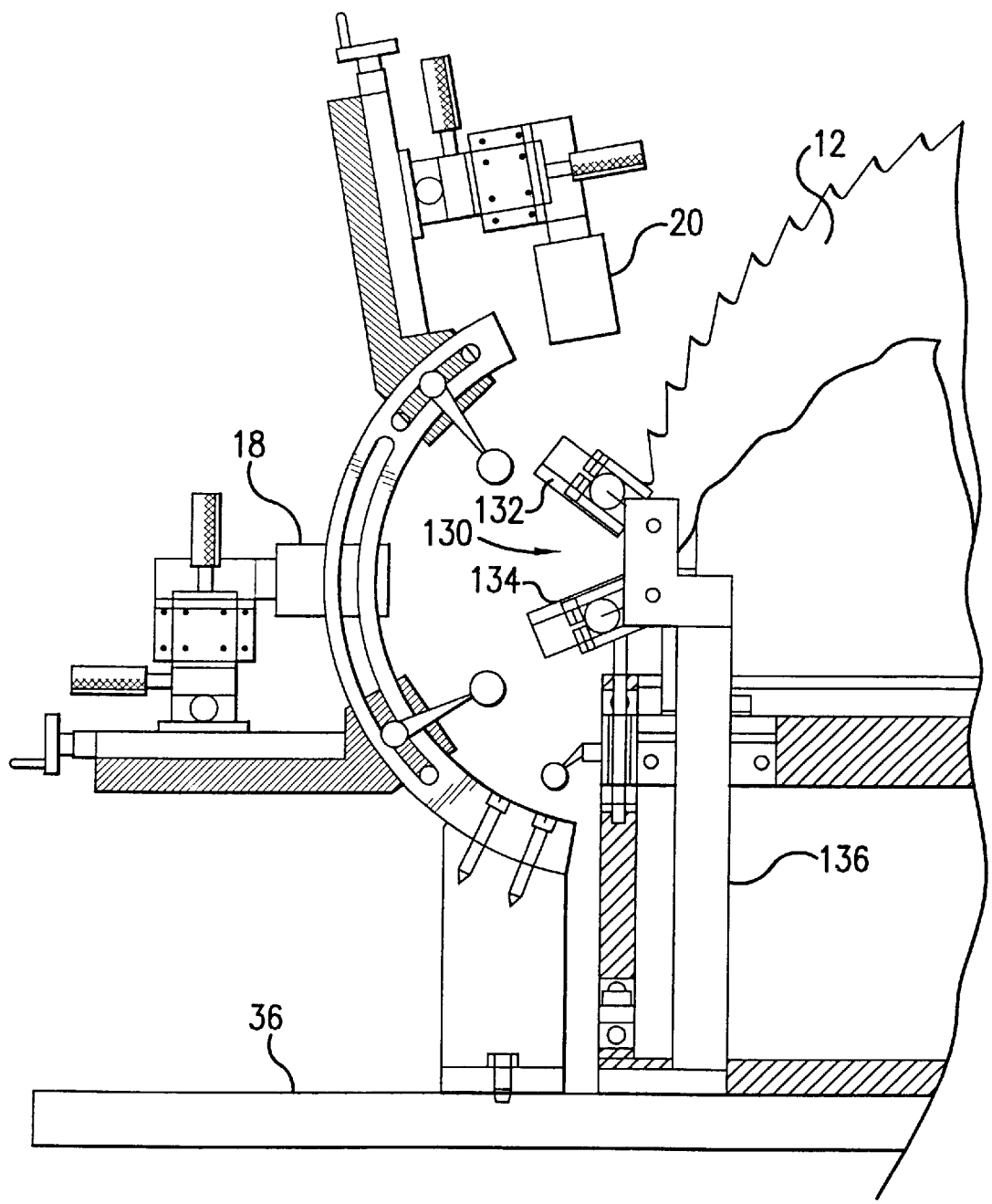
FIG. 5 is a side elevation view, partly in cross section, of a portion of a system in accordance with the invention showing a first embodiment of a pair of light transmitting rings for illuminating a saw tooth being inspected.
Figure 6:
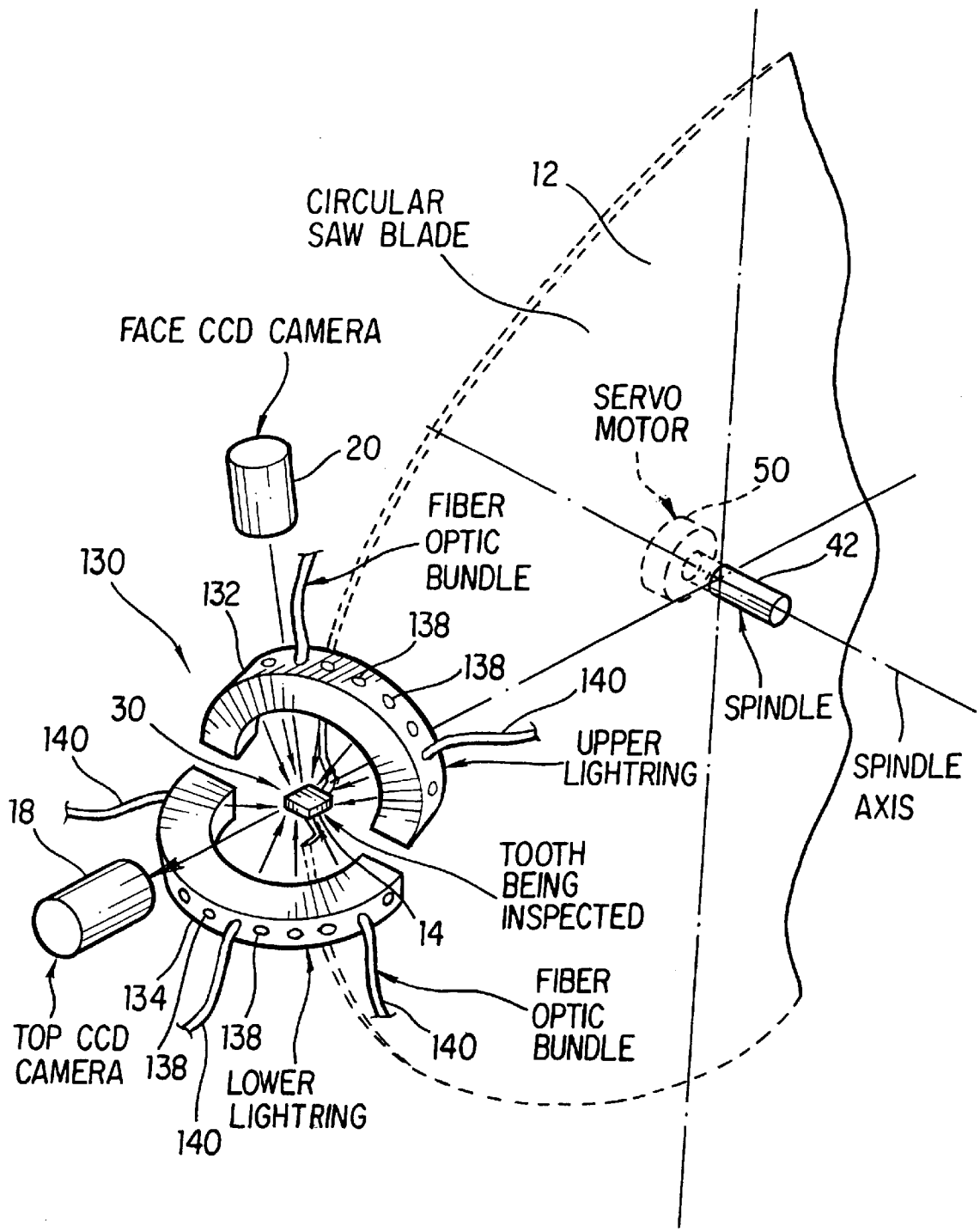
FIG. 6 is a schematic, perspective view of the light rings of FIG. 5, showing their relationship to the video cameras of the system and the saw tooth being inspected.
Figure 7:
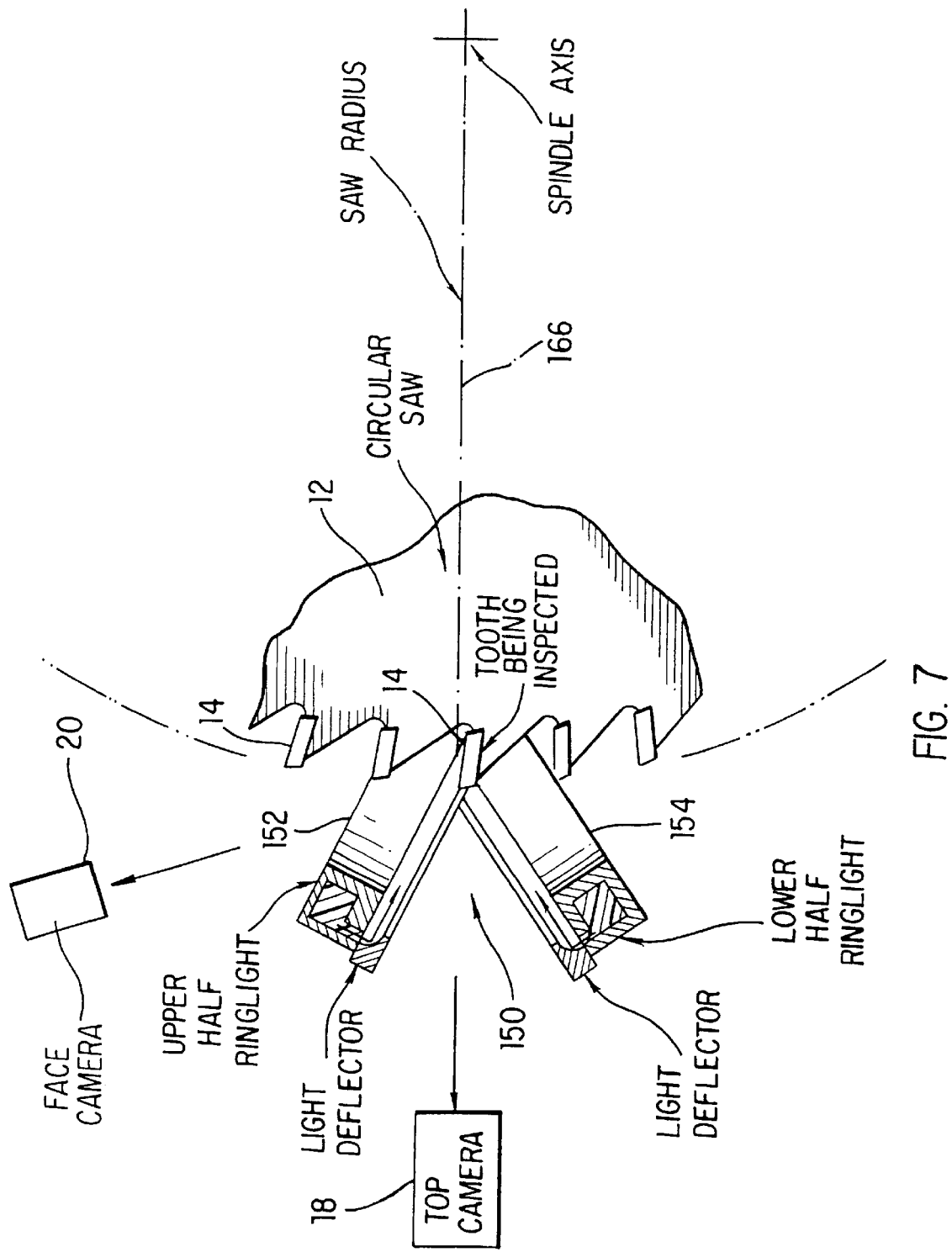
FIG. 7 is a side elevation view, partly in cross section, of a portion of a system in accordance with the invention showing a second embodiment of a pair of light transmitting rings for illuminating a saw tooth being inspected.
Figure 8:
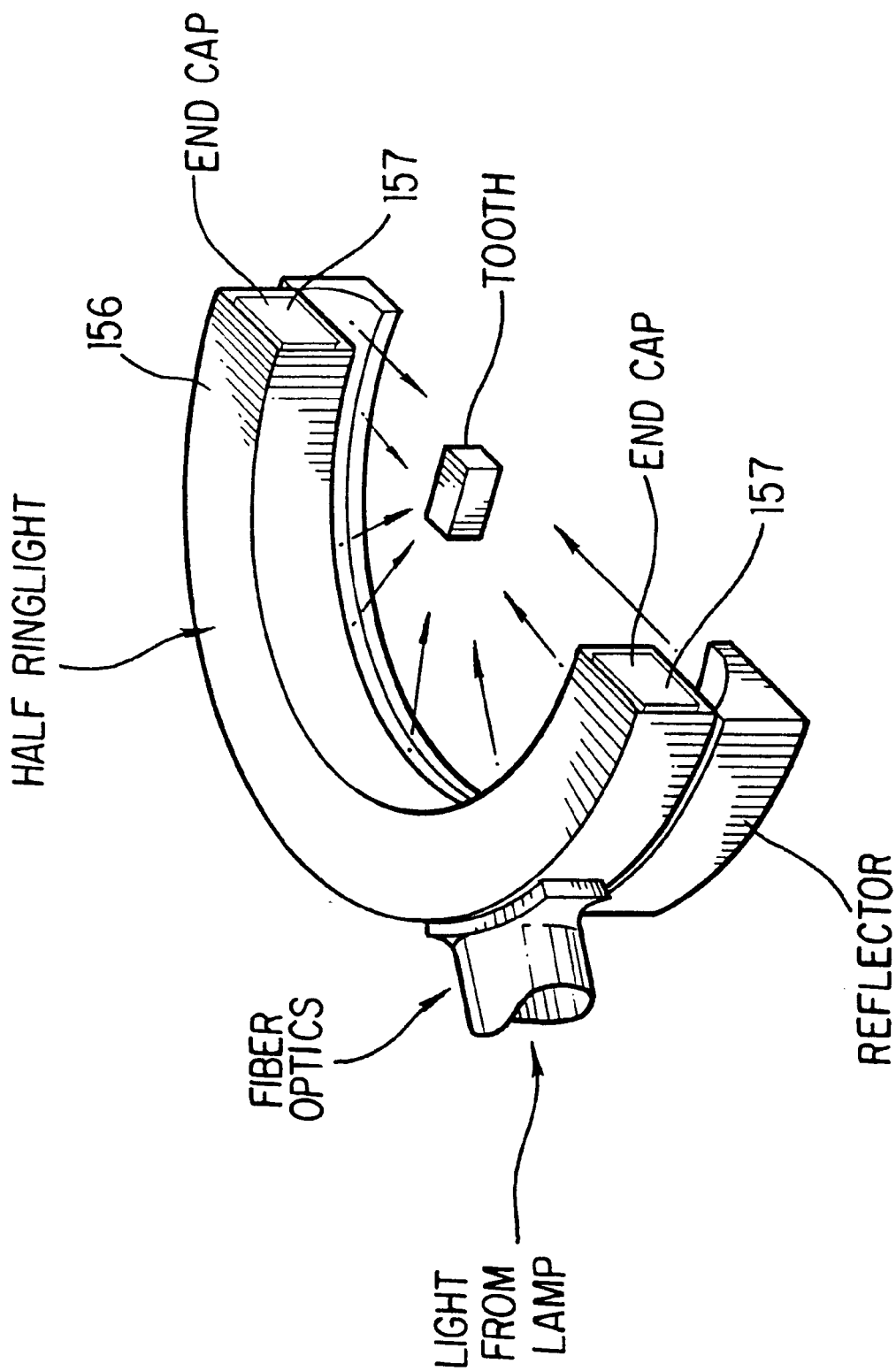
FIG. 8 is a perspective view of one of the light rings shown in FIG. 7.
Figure 9:
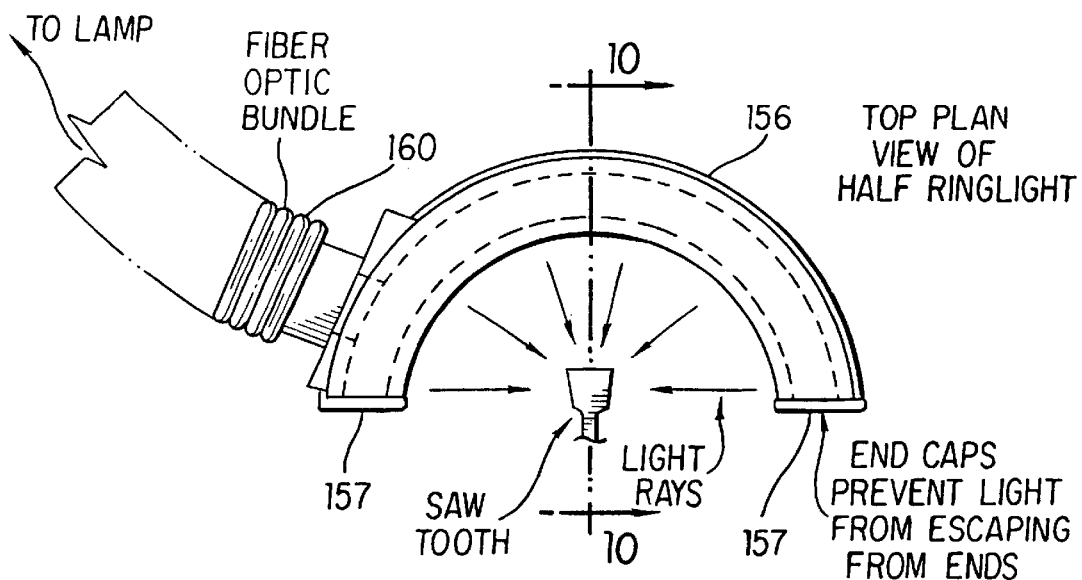
FIG. 9 is a top plan view of the light ring shown in FIG. 8.

FIGS. 5 and 6 show a first embodiment of a device, identified by the reference numeral 130, for transmitting light from a light source (not shown) to the inspection zone 30 for illuminating the tooth 14 to be inspected. The light transmitting device 130 of FIGS. 5 and 6 comprises upper and lower, semicircular housings 132 and 134 mounted on supports 136 fastened to the base 36. Each of the housings 132, 134 has a plurality of radially extending apertures 138 at least several of which carry fiber optic bundles 140. The radially oriented fiber optic bundle apertures 138 converge approximately at the tooth positioned in the inspection zone 30. Thus, light rays from a light source disposed adjacent the outer extremities of the radially oriented fiber optic bundles 140 and emerging from the inner extremities of the fiber optic bundles converge approximately on the top and face of the tooth to be inspected.

Figure 10:
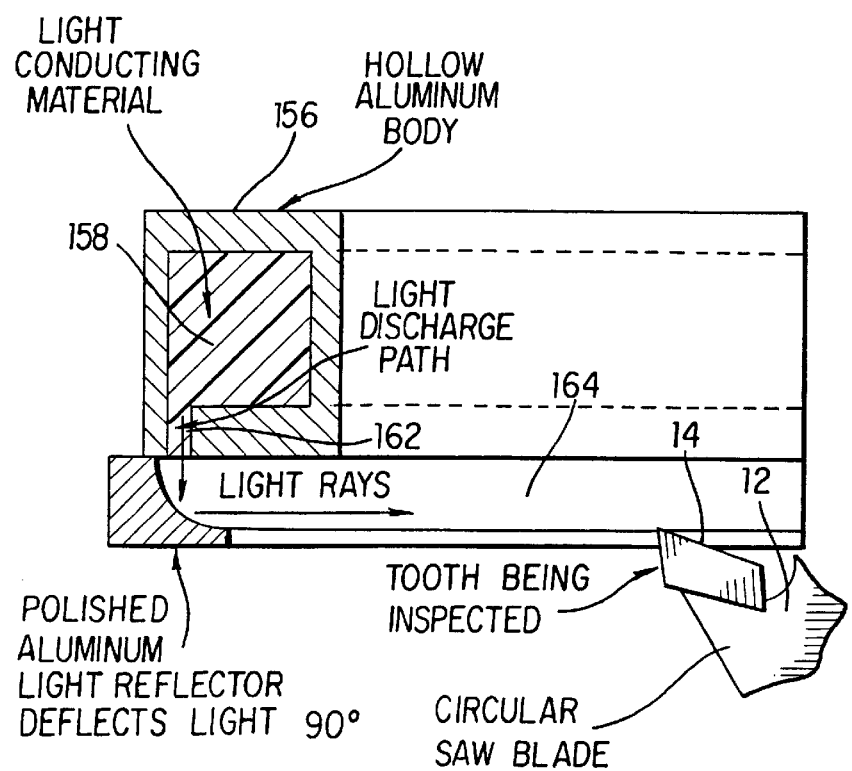
FIG. 10 is a side elevation view, in cross section, of the light ring of FIG. 9 as seen along the line 10—10.

FIGS. 7–10 illustrate a second embodiment of a light transmitting device, identified by the reference numeral 150, for illuminating the face and top of a tooth 14 to be inspected. The device 150 includes substantially identical upper and lower semicircular ringlights 152 and 154 of the kind manufactured by the Fostec Division of Schott-Fostec LLC, Auburn, N.Y., U.S.A. Each ringlight comprises a semicircular, hollow aluminum housing 156 with internal light reflecting end caps 157. The housing 156 is filled with a light-transmitting plastic or epoxy 158. Light from a fiber optic bundle 160 is transmitted by the light-transmitting material 158 around the half ringlight and to the exterior of the ring by means of a light discharge path 160 (FIG. 10). A semicircular polished aluminum reflector 164 attached to the surface of the half ringlight adjacent the light discharge path 162 deflects the light 90° toward the saw tooth to be illuminated. Light emerging from the ringlights thus converges on the tooth to be inspected to uniformly illuminate the surfaces thereof and particularly the top and face while at the same time providing a high degree of contrast between those surfaces and the background. Viewed from the side, as in FIG. 7, the ringlights 152 and 154 are disposed at angles relative to a horizontal radius 166 of the saw blade so as to provide the required illumination without blocking the paths of reflected light from the tooth face and top to the video cameras 18 and 20.

Figure 11A:
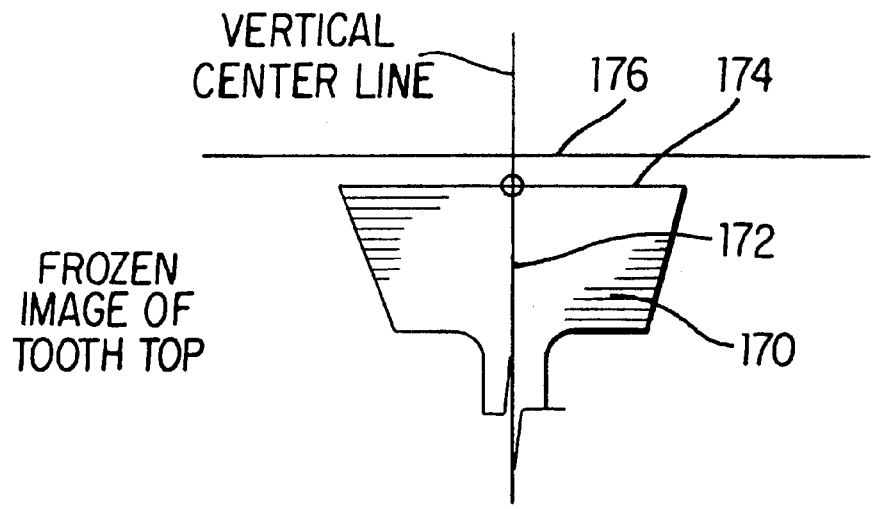
FIGS. 11a and 11b show images of the top of a tooth of a carbide tooth circular saw blade as they would appear on an image monitor forming part of the inspection system of the present invention.

Fine tooth positioning is accomplished as follows. A tooth image is acquired by the first or tooth top video camera 18 which transmits its viewed image to the frame grabber 24 which digitizes the analog image data. The resulting digital image 170 (FIG. 11a) is automatically frozen and measurements are taken using the contrast between the tooth surface and the background. The tooth must be as bright (white) as possible and the background as black as possible. A vertical line 172 is generated by the software, projected in the center of the screen and read in. The tooth top edge (seen as a boundary line 174 in FIG. 11a) is determined to be where the slope of the vertical line 172 is maximum indicating the most a rapid change from black to white or vice versa. The tooth is centered vertically by stepping the servo motor 50 through an angular displacement proportional to the distance the top edge of the tooth is off center relative to a horizontal reference line 176. This process may be repeated several times until the tooth is centered. Compensation may also be provided for backlash caused by friction and play in the spindle servo drive. Thus, the system uses video data and an appropriate algorithm to control the spindle servo motor 50 to rotate the saw blade 12 through minute displacements as necessary to accurately position the saw tooth in the proper field of view to bring the tooth top and face into sharp focus.

Tooth measurements are rapidly made by finding the tooth edge and drawing a long line across the tooth. The edge is located using the contrast measurement technique described above and a smaller window opened on this point. The tooth edge is found within this window. The window is moved if the edge moves too far which can happen due to tooth angle. The values are sorted and low values (resulting from grinder marks) are excluded from the final average.

Figure 11B:
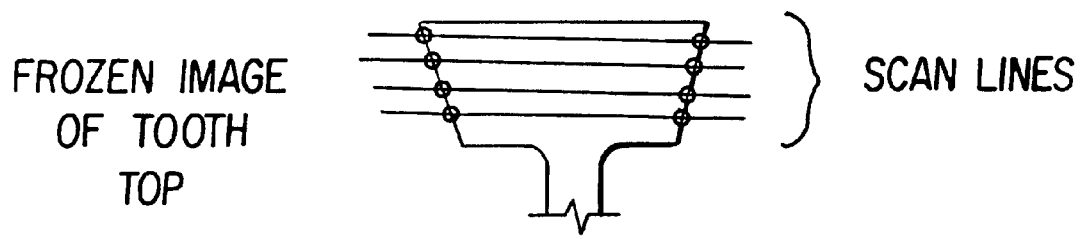
Figure 11C:
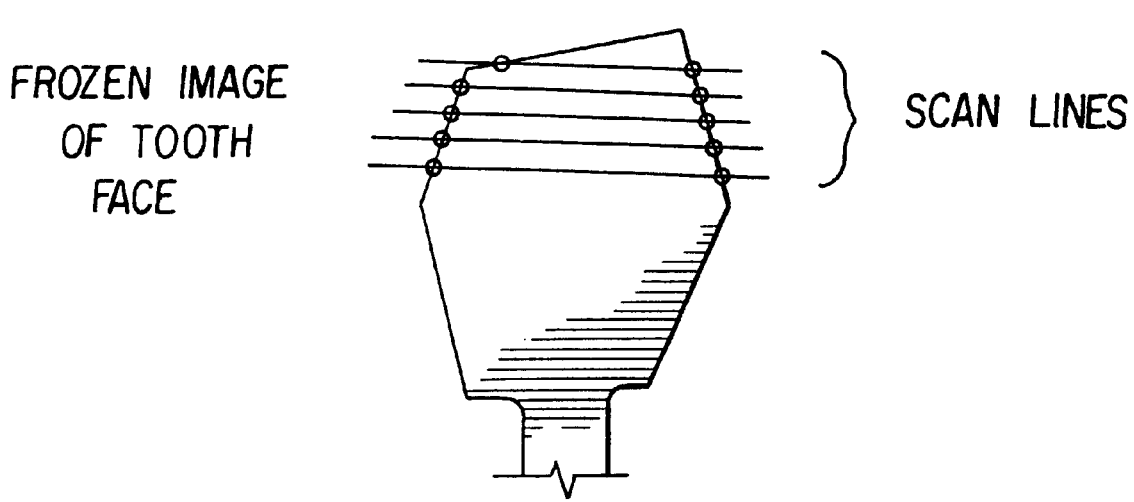
FIG. 11c shows an image of the face of a tooth of a carbide tooth circular saw blade as it would appear on said image monitor.

With reference specifically to FIGS. 11b and 11c, tooth angles and widths are computed by first sequentially scanning the digitized image in memory representing the image of the tooth face. Corners are located by measuring the slope of the filtered line. Least squares curve fitting is then applied to each line segment. The line segment crossing points are then computed and tooth widths and angles determined.

Figure 12:
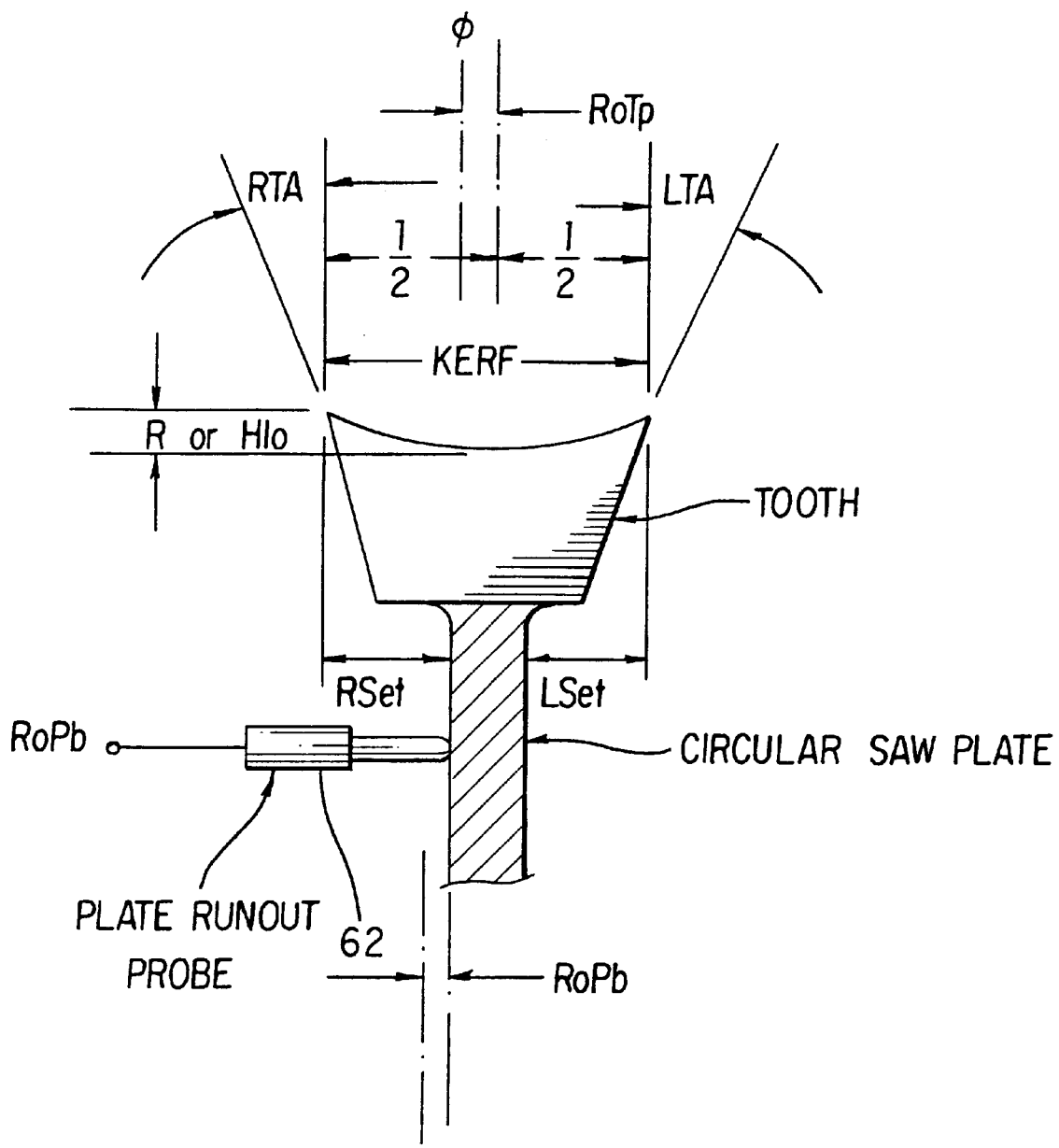
FIG. 12 is a front view, partly in cross section, of a portion of a carbide tooth circular saw blade showing the geometry of the top of a typical carbide tooth and several of the measurements that may be made thereof by an inspection system in accordance with the present invention.
Figure 13A:
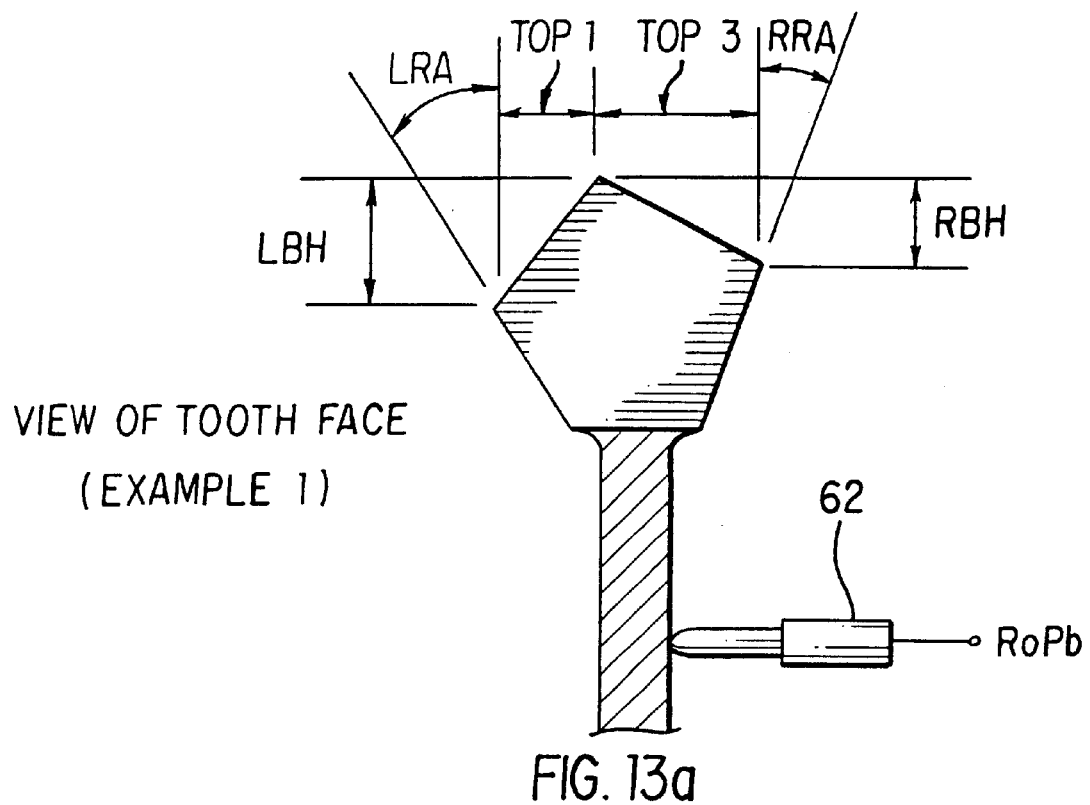
FIGS. 13a and 13b are plan views, partly in cross section, of portions of carbide tooth circular saw blades showing, respectively, a first and second examples of the geometries of carbide tooth faces, and various measurements that may be made thereof by an inspection system in accordance with the present invention.
Figure 13B:
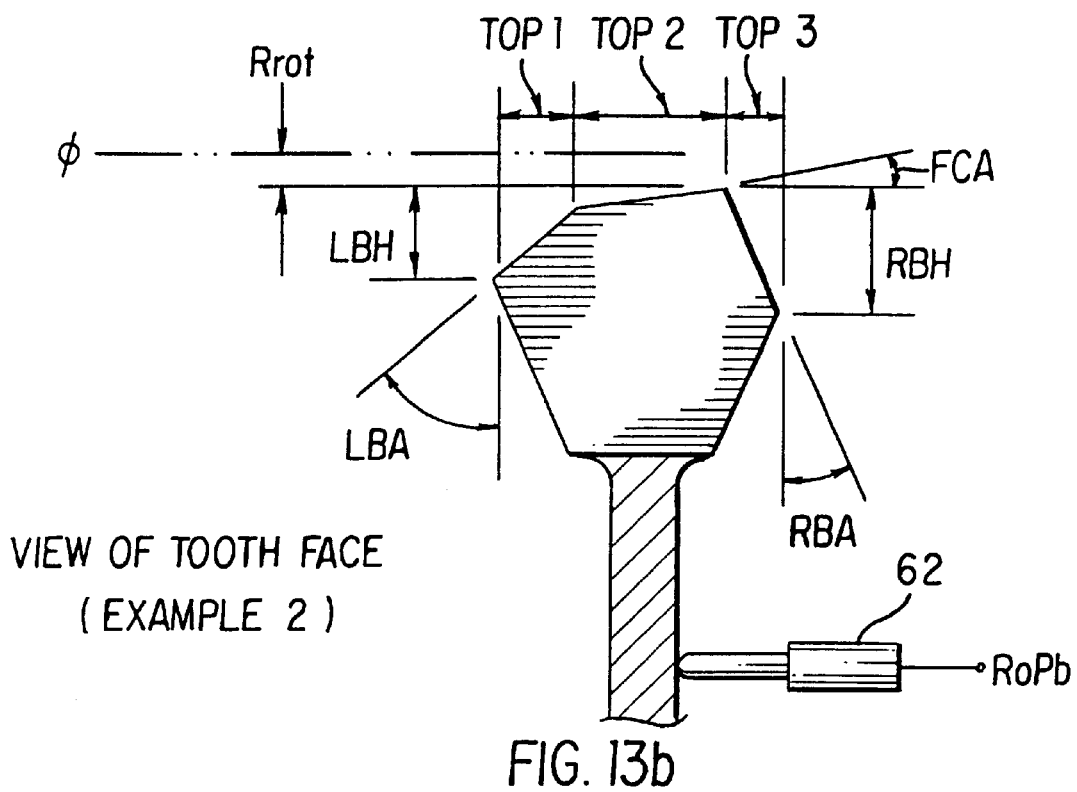

FIGS. 12, 13a and 13b show various tooth parameters which may be measured by the inspection system of the present invention. FIG. 12 shows an example of an image of a tooth top while FIGS. 13a and 13b represent images of exemplary tooth faces. The plate runout measurement provided by the probe 62 is used with the tooth edge data to determine the left and right tooth side clearances. The computed edge lines are also superimposed on the tooth image so that the scan process can be checked. In the automatic mode, tooth results are displayed in a graphical format. This data can be saved to a data file for spread sheet analysis. In the automatic mode, about 450 measurements may be made in 2.25 minutes.

A printout of calculated measurements may be provided as shown, by way of example, in FIG. 14. FIG. 15 lists the definitions of the various measurements shown in FIGS. 12–14.

While the present invention has been described with reference to particular illustrative embodiments, the invention is not intended to be restricted to those embodiments but only by the appended claims. It will be appreciated that those skilled in the art can change or modify the described embodiments, or substitute equivalents for the various elements and steps described and shown, without departing from the scope and spirit of the invention. For example, it will be evident that one or more additional video cameras may be used to image other saw tooth surfaces, such as the lateral or side surfaces, so as to provide additional measurements and quality control. Further, it will be evident that instead of two light transmitters such as the two semicircular ringlights, only one may be used to illuminate the tooth under inspection, or still further, more than two light transmitters may be utilized.

We claim:

1. A system for inspecting first and second surfaces of a cutting member, the system comprising:
   a support for carrying the cutting member, the cutting member being movable relative to the support to permit positioning the surfaces to be inspected within an inspection zone;
   a first video camera mounted relative to the inspection zone to provide output signals representative of the image of the first surface to be inspected;
   a second video camera mounted relative to the inspection zone to provide output signals representative of the image of the second surface to be inspected;
   a computer responsive to the output signals provided by the first and second video cameras for analyzing said output signals and calculating selected attributes of the surfaces presented for inspection; and
   a video monitor coupled to the computer for displaying said selected attributes.

2. A system, as defined in claim 1, further including:
   a memory for storing a frame of the video signals generated by the first video camera and for storing a frame of the video signals generated by the second video camera; and
   a second video monitor for selectively displaying the stored frames of the video signals.

3. A system, as defined in claim 1, including:
   an actuator coupled to the cutting member, the actuator being connected to an output of the computer for moving the cutting member to accurately position the surfaces of the cutting member within said inspection zone in response to the output signals generated by the first and second video cameras.

4. A system, as defined in claim 1, further including:
   at least one light transmitter mounted on the support, the light transmitter comprising an arcuate housing surrounding the inspection zone, the housing carrying light conducting material for conducting light from a light source and directing said light to substantially uniformly illuminate the inspection zone.

5. A system, as defined in claim 4, in which:
   the light transmitter housing is semicircular, the light transmitter housing being substantially centered on the inspection zone and filled with a light conducting plastic.

6. A system, as defined in claim 4, in which:
   the light transmitter housing is semicircular, the light transmitter housing being substantially centered on the inspection zone and carrying radially extending fiber optic bundles.

7. A system, as defined in claim 1, in which:
   the video images of the first and second surfaces are provided simultaneously by the first and second video cameras.

8. A system, as defined in claim 1, in which:
   the cutting member comprises a tooth of a saw blade, the first surface comprises the face of the saw blade tooth and the second surface comprises the top surface of the tooth.

9. A system, as defined in claim 8, in which:
   the saw blade comprises a circular saw blade having a nominal plane;

the first video camera has an optical axis;

the second video camera has an optical axis; and the optical axes of the first and second video cameras lie substantially within a plane coplanar with the nominal plane of the circular saw blade.

10. A system, as defined in claim 9, including:

a displacement measuring device mounted on said support, the displacement measuring device being adapted to generate an output responsive to the runout of the circular saw blade.

11. A system, as set forth in claim 1, which includes:

a base, the support for carrying the cutting member being mounted on the base;

a bracket mounted on said base, the first and second video cameras being mounted on the bracket, the positions of the first and second video cameras being independently adjustable relative to the bracket.

12. A system, as defined in claim 11, in which:

the position of the first video camera is adjustable relative to the bracket along three mutually perpendicular axes; and the position of the second video camera is adjustable relative to the bracket along three mutually perpendicular axes.

13. A system, as defined in claim 1, which includes:

a cutting member position setting device mounted on the support, the position setting device including a reference surface to aid in positioning the cutting member relative to the first and second video cameras.

14. A method for inspecting first and second surfaces of a cutting member using first and second video cameras, respectively, the method comprising the steps of:

moving the cutting member to position the first and second surfaces within an inspection zone;

providing electrical video signals from the first video camera representative of the image of the first surface presented for inspection;

storing a frame of said video signals provided by the first video camera;

providing electrical video signals from the second camera representative of the image of the second surface presented for inspection;

storing a frame of said video signals provided by the second camera; and selectively displaying the stored frames.

15. A method, as defined in claim 14, further including the step of:

providing an electrical signal representative of the displacement of the cutting member from a reference position.

16. A method, as defined in claim 14, wherein:

the cutting member is moved to accurately position the first and second surfaces of the cutting member within the inspection zone in response to said video signals.

17. A method, as defined in claim 14, further including the step of:

substantially uniformly illuminating the inspection zone.

18. A system for inspecting each tooth of a carbide tooth circular saw blade and for providing measurements of selected attributes of each tooth, each tooth having a top surface and a face, the saw blade having a nominal plane and a central spindle-receiving aperture, the system comprising:

a base;

a rotatable spindle carried by the base, the spindle being adapted to be received by the spindle-receiving aperture of the saw blade, the spindle being movable relative to the base to position the tooth top and face within an inspection zone;

a light transmitter disposed adjacent the inspection zone for transmitting light from a light source to the inspection zone to substantially uniformly illuminate the face and the top of a tooth positioned in the inspection zone;

a first video camera mounted relative to the inspection zone, the first video camera generating output signals representative of the image of the top of the tooth being inspected, the first video camera having an optical axis;

a second video camera mounted relative to the inspection zone, the second video camera generating output signals representative of the image of the face of the tooth being inspected, the second video camera having an optical axis, the optical axes of said first and second video cameras lying in a plane substantially coplanar with the plane of the circular saw;

a computer responsive to the output signals from the video cameras for analyzing the signals and calculating the selected tooth attributes; and video monitor means coupled to the computer for displaying the images and said selected tooth attributes.

19. A system, as defined in claim 18, further including:

a memory for storing a frame of the video signals generated by the first video camera and for storing a frame of the video signals generated by the second video camera; and the video monitor means including a video monitor for selectively displaying the stored frames of the video signals.

20. A system, as defined in claim 19, in which:

the video images of the first and second surfaces are provided simultaneously by the first and second video cameras for selective display.

21. A system, as defined in claim 18, including:

a servo motor coupled to the rotatable spindle, the servo motor being connected to an output of the computer for moving the saw blade to accurately position the tooth top and face within a field of view within said inspection zone in response to the output signals generated by the first and second video cameras.

22. A system, as defined in claim 18, in which:

the light transmitter includes a semicircular housing, the light transmitter housing being substantially centered on the inspection zone and filled with a light conducting plastic.

23. A system, as defined in claim 18, in which:

the light transmitter includes a semicircular housing, the light transmitter housing being substantially centered on the inspection zone and carrying radially extending fiber optic bundles.

24. A system, as defined in claim 18, including:

a runout measuring probe mounted on said base, the probe being adapted to contact a side of the circular saw blade and generate an output in response to the runout of the saw blade, the output of the probe being connected to an input on the computer.

25. A system, as set forth in claim 18, which includes:

a bracket mounted on the base, the first and second video cameras being mounted on the bracket, the positions of the first and second video cameras being independently adjustable relative to the bracket.

26. A system, as defined in claim 25, in which:

the position of the first video camera is adjustable relative to the bracket along three mutually perpendicular axes; and the position of the second video camera is adjustable relative to the bracket along three mutually perpendicular axes.

27. An apparatus, as defined in claim 18, which includes:

a tooth position setting device mounted on the base, the position setting device including a reference surface to aid in positioning the tooth relative to the first and second video cameras.

* * * * *